(12) United States Patent
Münch et al.

(10) Patent No.: US 6,612,647 B1
(45) Date of Patent: Sep. 2, 2003

(54) SAFETY DEVICE FOR VEHICLE SEAT BENCHES

(75) Inventors: Ingo Münch, Wuppertal (DE); Sascha Pusch, Burscheid (DE); Lutz Strieder, Remscheid (DE); Bernd Deissmann, Wuppertal (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/831,119

(22) PCT Filed: Oct. 30, 1999

(86) PCT No.: PCT/EP99/08297

§ 371 (c)(1),
(2), (4) Date: Aug. 3, 2001

(87) PCT Pub. No.: WO00/27667

PCT Pub. Date: May 18, 2000

(30) Foreign Application Priority Data

May 11, 1998 (DE) .................................. 298 19 764 U

(51) Int. Cl.⁷ .................................................. B60N 2/08
(52) U.S. Cl. ............................. 297/216.1; 297/216.18; 297/344
(58) Field of Search ..................... 297/216.18, 216.1, 297/344.1; 248/424, 429

(56) References Cited

U.S. PATENT DOCUMENTS

| | | | | |
|---|---|---|---|---|
| 3,897,101 A | * | 7/1975 | Hess ........................ 296/68.1 |
| 4,209,159 A | * | 6/1980 | Becker et al. ............... 248/430 |
| 4,225,177 A | * | 9/1980 | Klüting ................. 297/378.11 |
| 4,232,895 A | * | 11/1980 | Yoshio et al. ............... 296/68.1 |
| 5,125,611 A | * | 6/1992 | Cox ........................... 248/429 |
| 5,368,355 A | * | 11/1994 | Hayden et al. .......... 296/65.13 |
| 5,730,412 A | * | 3/1998 | Shrock ...................... 248/429 |
| 5,873,558 A | * | 2/1999 | Sakamoto ................... 248/429 |

FOREIGN PATENT DOCUMENTS

DE            4414027 C1    *   8/1995

* cited by examiner

Primary Examiner—Peter M. Cuomo
Assistant Examiner—Joseph Edell
(74) Attorney, Agent, or Firm—Foley & Lardner

(57) ABSTRACT

The present invention relates to a safety device (3) for a vehicle bench seat (1) that can be moved via two lateral, parallel guide tracks (2) within a vehicle across an adjustable range and can be locked in various positions, consisting of a safety rail (4), which is arranged roughly in the center between the guide tracks (2) and parallel to these tracks, and of a safety sled (6), which is guided in a relatively flexible manner at least across the actual adjustable range of the bench seat (1). The safety sled (6) is arranged in such a manner that it can move freely lengthwise to the safety rail (4) during regular sliding motions and in positions within the adjustable range of the bench seat (1) and interlocks with the safety rail (4) due to irregular deformations in the area of the bench seat (1).

11 Claims, 5 Drawing Sheets

Figure 1:
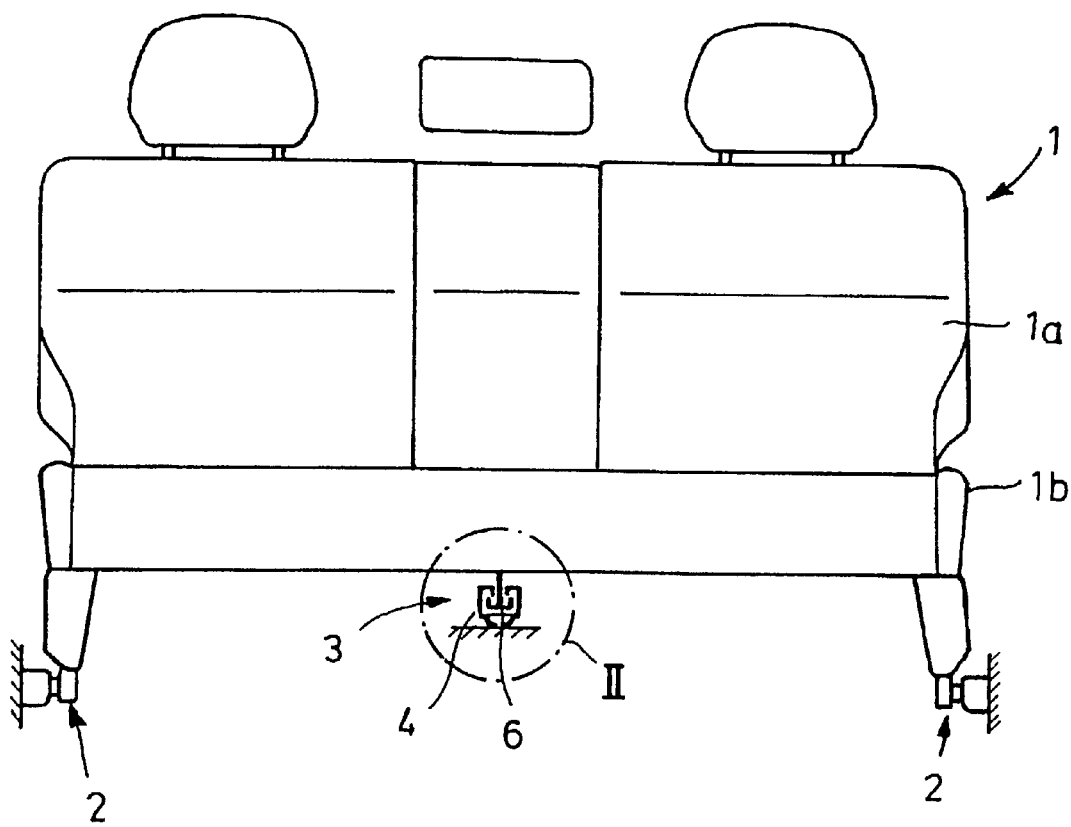

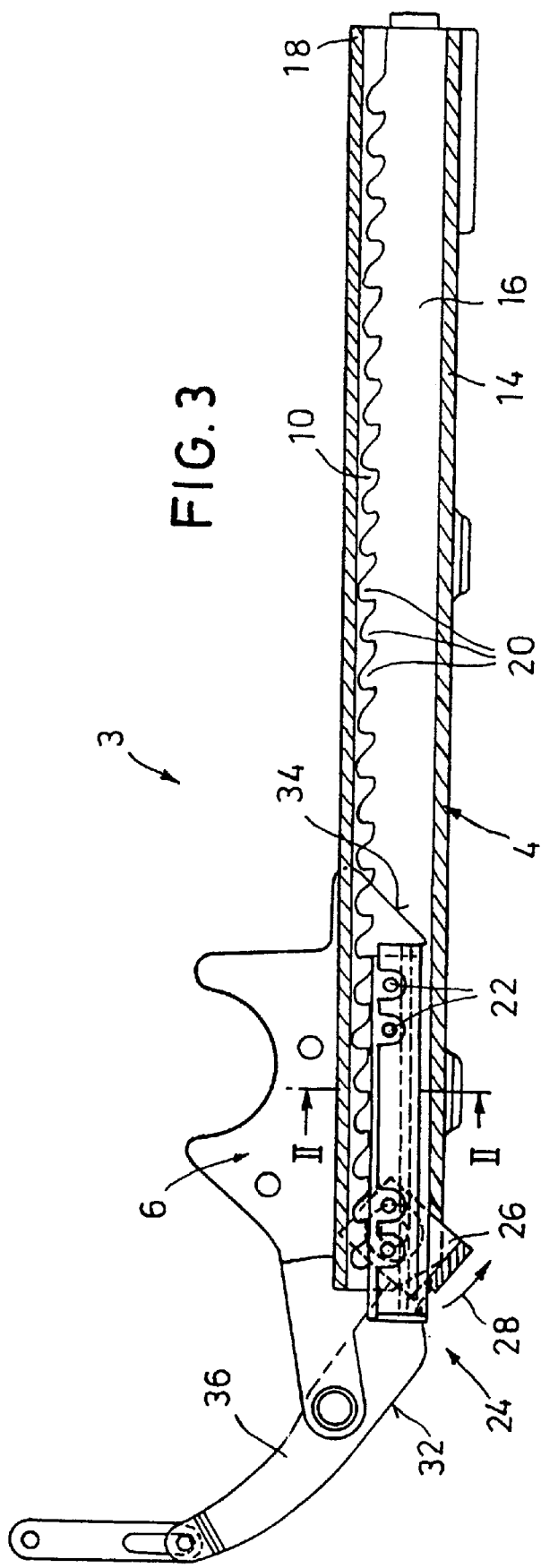
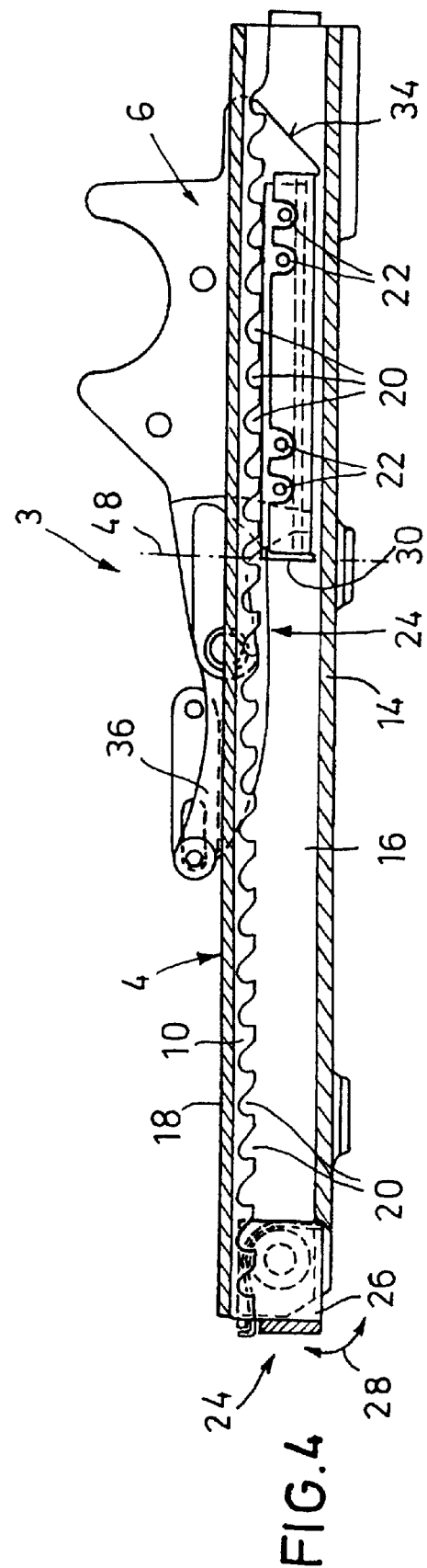

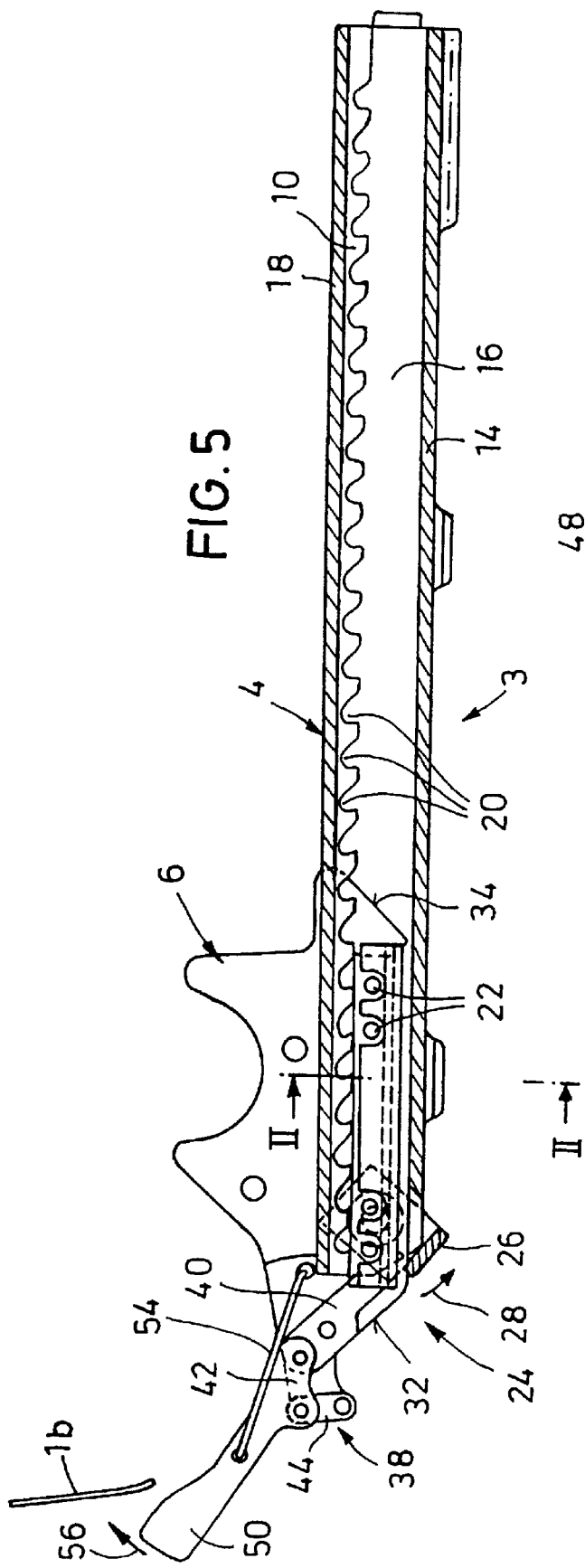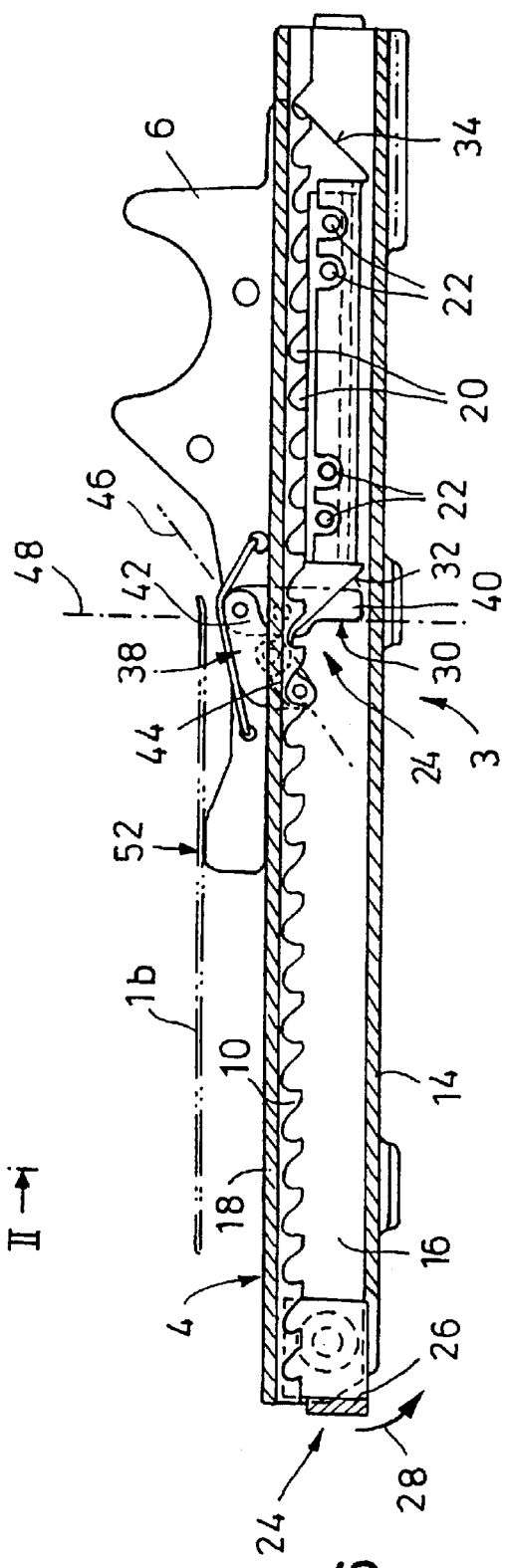
FIG.5
FIG.6

SAFETY DEVICE FOR VEHICLE SEAT BENCHES

The present invention relates to a novel safety device for a vehicle bench seat, which can be moved across an adjustable range through two lateral, parallel guide tracks within the vehicle and can be locked in various positions.

Some vehicles, particularly high-capacity vehicles, i.e. so-called vans, are nowadays equipped with several, e.g. three, rows of seats, of which especially the second row, but possibly alternatively or additionally also the third row, is designed as a bench seat that can be moved in the vehicle's longitudinal direction. This allows, on the one hand, flexibility regarding the passengers' legroom by being able to lock the bench seat in various positions within a certain adjustable range. On the other hand, by sliding the entire bench seat into a non-usage position, additionally usable space can be adjusted in some vehicles in order to be able to store luggage or other cargo.

Such bench seats of course must be equipped around their center with at least one anchoring device for a safety belt so that all passengers, including the one(s) in the center, can fasten their seat belts. Through the respective seat belt anchoring device, however, reaction power is introduced into the bench seat when breaking forcefully and during accidents (head-on and rear-end collisions). These forces can be so high that deformations of the entire bench seat and/or its supporting structure can occur. Subsequently, this can also lead to deformations in the area of the lateral guide tracks, in a worst-case scenario the entire bench seat may even be torn out, so that the passengers lose their restraint and are therefore exposed to extremely high risks of injuries.

The invention is therefore based on the task of raising the safety of such adjustable bench seats and thus reduce the risk for injuries for the passengers considerably.

According to the invention, this is accomplished with a safety device based on claim 1. Beneficial developments of the invention are included in the dependent claims.

In accordance with the invention, a novel safety device therefore consists of (at least) one safety rail that is arranged roughly in the center between the lateral sliding tracks and parallel to these tracks and of one safety sled that is guided in a relatively flexible manner at least across the adjustable range of the bench seat. The safety rail is fastened preferably in a stationary manner to the vehicle's bottom beneath the bench seat, while the safety sled is allocated to the bench seat, i.e. is firmly fastened to the bottom configuration of the bench seat so that it is moveable jointly with the bench seat relative to the stationary safety rail. Kinematic reversal is certainly within the range of the invention. According to the invention, the safety sled is arranged in such a manner that it can move freely lengthwise to the safety rail, preferably in a non-contact manner in all directions, during normal sliding motion and in positions within the adjustable range of the bench seat. It is also feasible to prove support via support rollers or similar means through forces that point downward vertically, which is beneficial particularly in the case of heavy passengers or objects. The relative configuration between the safety rail and the safely sled moveable in the rail in accordance with the invention, however, is such that with irregular, particularly brake or crash-related, deformations within the bench seat area the safety sled interlocks with the safety rail. In such a case, an additional anchoring process of the bench seat takes place roughly in its center, effectively absorbing the reaction powers that are introduced. This feature safely avoids excess stress and resulting damage, particularly e.g. a complete detachment of the entire bench seat from its fasteners, within the area of the lateral guide tracks.

In a beneficial embodiment of the invention the safety device has been designed specifically for such bench seats that can be moved into a non-usage position beyond their actual adjustable range (usage range), particularly to increase the cargo area within the vehicle. In this embodiment, controllable stop devices are incorporated in accordance with this invention between the safety rail and the safety sled so that—with a position of the seat back and/or seat cushion of the bench seat that is suitable for sitting—the sliding movement is limited to the actual adjustable range due to automatic activation of the stop devices and thus a sliding into the non-usage position is excluded, while further movement of the bench seat into the non-usage position is released by deactivating (releasing) the stop devices only during the folded non-usage position of the seat back and/or seat cushion of the bench seat. This beneficial embodiment represents a particularly important safety aspect since the bench seat must first be brought into a folded non-usage position in order to even be able to bring it into the non-usage position. This avoids the non-usage position from being able to be assumed with passengers sitting on the bench seat. In other words, this means that people can only sit on the bench seat if the bench seat is within its actual adjustable range, which means that it is effectively secured by the invented safety device.

Figure 2:
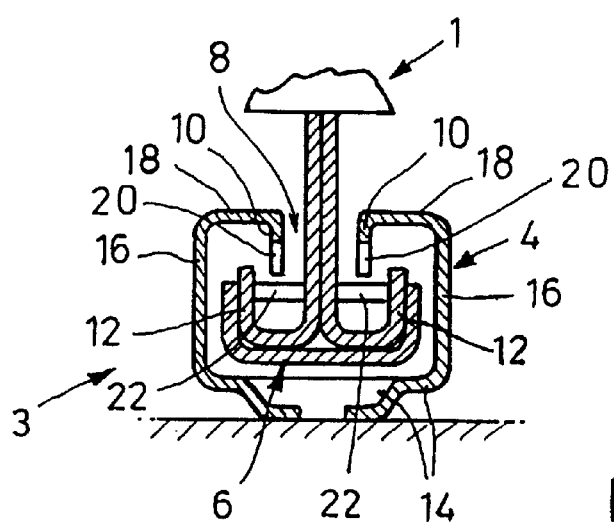
Figure 7:
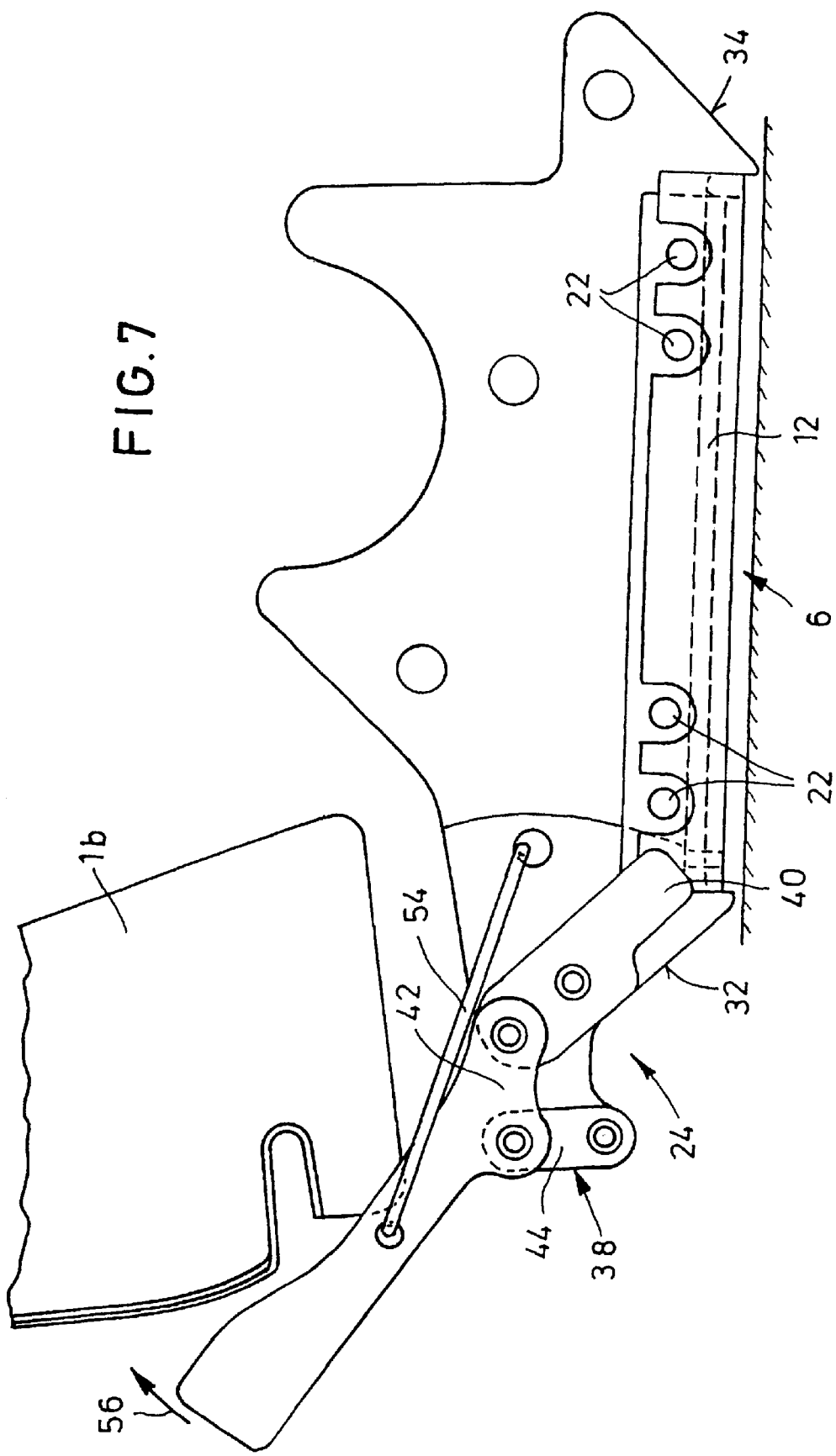
Figure 8:
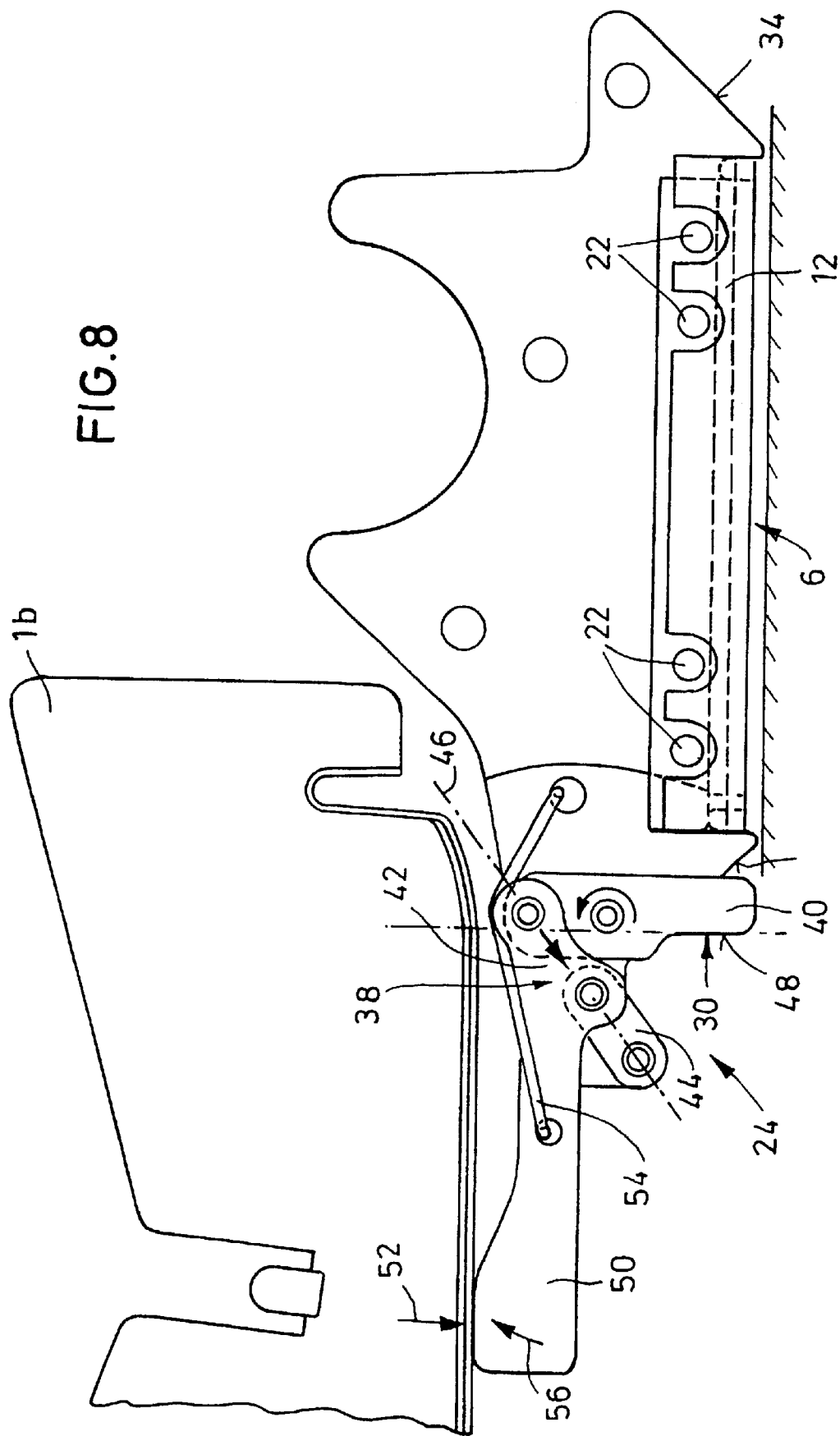

The invention is now explained more in detail based on the preferred embodiments, which are depicted in the drawing. They show:

FIG. 1 diagrammatic front view of a vehicle bench seat with an invented safety device, FIG. 2 enlarged sectional view in the area of the safety device (area II according to FIG. 1 and/or section II—II according to FIG. 3 and/or FIG. 5), FIG. 3 diagrammatic side view of the safety device in the direction of the arrow X according to FIG. 2 in a first embodiment and in a first functional position, FIG. 4 embodiment according to FIG. 3 in a second functional position, FIG. 5 view similar to FIG. 3 in a second embodiment of the invented safety device in a functional position that corresponds to FIG. 3, FIG. 6 view similar to the functional position depicted in FIG. 4 of the second embodiment of the safety device, FIG. 7 enlarged detailed view of the embodiment and functional position according to FIG. 5 and FIG. 8 enlarged detailed view of the functional position according to FIG. 6

Similar and/or functionally corresponding parts have been marked with the same reference codes in the various figures of the drawing and are therefore also usually only described once.

FIG. 1 depicts a vehicle bench seat 1, which can be moved across a certain adjustable range in the vehicle's longitudinal direction due to two lateral, parallel guide tracks 2 within a vehicle and can be locked in various positions. The guide tracks 2 consist in the familiar fashion of stationary sliding tracks that are fastened to the vehicle and of gliding and/or roller elements that are connected with the bench seat and guided in the sliding tracks. Suitable stopping devices are provided for locking the bench seat 1 in the respectively desired longitudinal position in the vehicle. Beyond that, the guide tracks 2 are not part of the invention and are therefore not described more in detail in the following.

According to the invention, the bench seat 1 is equipped with a novel safety device 3, which basically consists of (at least) one safety rail 4, which is arranged roughly in the geometrical center between the guide tracks. 2 and parallel to these tracks, and of one safety sled 6, which is guided in this track in a relatively flexible manner at least across the actual adjustable range of the bench seat. The safety rail 4 is fastened preferably in a stationary manner in the area that is located vertically beneath the bench seat 1, while the safety sled 6 is attached in the area of a bottom supporting structure on the bench seat 1. Under normal circumstances, i.e. during regular sliding motions as well as in the respective adjustable positions of the bench seat 1 within its actual adjustable range, the safety sled 6 is arranged in such a manner that it can move freely lengthwise to the safety rail 4. This means preferably that the safety sled 6 is held within the safety rail 4 largely in a non-contact manner in all directions in space, which can be seen particularly in FIG. 2. If however irregular deformations occur in the area of the bench seat 1 during forceful, e.g. accident-related, deceleration or acceleration due to reaction powers that are introduced particularly through the seat belt anchoring devices, then according to the invention the safety sled 6 interlocks with the safety rail 4. The invented safety device 3 therefore has practically no functional purposes during normal operation of the vehicle and does not take effect until for example an accident occurs in which case an additional locking process of the bench seat 1 is ensured and the passengers are protected effectively from injuries by ensuring that the seat belt restraint systems maintain their firmly anchored position. This feature therefore provides increased safety during both head-on and rear-end collisions.

In accordance with FIG. 2, the preferred embodiment provides a feature based on which the safety rail 4 has a roughly U-shaped cross-section that is open in the direction of the bench seat 1, i.e. vertical upward, to allow the safety sled 6 to interlock, with two fastening bridges 10 that limit an upper lengthwise opening 8. The safety sled 6, which engages with the safety rail 4 through the lengthwise opening 8, reaches behind the fastening bridge 10 with two lateral locking sections 12, and does so generally in a non-contact manner. The distance between the locking sections 12 of the safety sled and the fastening bridges 10 of the safety rail 4 however is selected so that even in the case of relatively small deformations of the bench seat 1 the safety sled 6 is moved relative to the safety rail 4 in such a manner that it engages and interlocks. In a useful embodiment, the cross-sectional profile of the safety rail 4 consists of a bottom 14, two side walls 16 that are basically vertical to the bottom 14 and two sectional bridges 18 that extend toward each other inward from the side walls 16 at a rectangular angle and to which the fastening bridges 10, which point inward in the direction of the bottom 14 and are basically parallel to one another, connect. In the area of the fastening bridges 10, the safety rail 4 is equipped with locking devices, particularly in the form of several especially saw-tooth like recesses 20 that are distributed across the length of the rail to allow at least one locking element 22 of the safety sled 6 to become interlocked. The locking elements 22 of the safety sled 6 are preferably designed as pins, which are arranged cross-wise to the sliding direction. We would also like to point out FIGS. 3 through 6 at this point, based on which the recesses 20 of the safety rail 4 are tapered so as to allow the locking elements 22 to be held positively in the usual forward driving direction when the locking elements 22 are interlocked. This means that the remaining sections between the recesses 20 point to the rear in the reverse direction of the vehicle in a saw-tooth like manner. In order to achieve good stability, the safety sled 6 is equipped, preferably in its front and rear areas, with two locking elements 22, respectively, which are located at a distance from each other in the sliding direction. Since during accidents the bench seat often tilts, at least two locking elements 22, respectively, interlock with the recesses 20 of the sectional rail 4 in the front or rear area.

In a preferred application example, the bench seat 1 can be moved within the vehicle beyond its actual adjustable range into a non-usage position, especially to increase the cargo area. For this feature, the invented safety device 3 incorporates controllable stop devices 24 between the safety rail 4 and the safety sled 6 so that—with a position of the seat back 1a and/or seat cushion 1b of the bench seat 1 that is suitable for sitting—the sliding motion is limited to the actual adjustable range due to automatic activation of the stop devices 24 and thus a sliding into the non-usage position is excluded, while further movement of the bench seat 1 into the non-usage position is released by deactivating (releasing) the stop devices 24 only in the folded non-usage position of the seat back 1a and/or seat cushion 1b of the bench seat, making normal sitting impossible. For this, the safety sled 6 moves out of the safety rail 4. In a position of the bench seat 1 that is suited for sitting, this feature is otherwise prevented automatically by the stop devices 24. This means that the invented stop devices 24 block the safety sled 6 in the moving direction from exiting the safety rail 4 in their activated mode, while the safety sled 6 can be moved out of the safety rail 4 lengthwise in the deactivated mode of the stop devices 24. It is particularly beneficial to be able to control the stop devices 24 directly with the parts of the bench seat 1. For this feature it is useful to equip the safety sled 6 that is connected with the bench seat 1 with control devices, onto which particularly the seat part 1b has a direct effect. In its end area pointing in the direction of the non-usage position, the safety rail 4 is equipped with a passively moveable stop element 26, which is held in such a stop position, preferably automatically through spring resistance, that it prevents the safety sled 6 from exiting the safety rail 4, while being allowed to move into a release position against the spring resistance. This is depicted in FIGS. 3 through 6, respectively, with the arrows 28. In contrast, the safety sled 6—see also separate pictures in FIG. 7 and 8—is equipped on the one hand with a counter-stop 30 and on the other hand with a tapered control surface 32 with such a design that in the activated mode of the stop devices 24 the counter-stop 30 is active and works against the stop element 26 of the safety rail 4 to limit movement, while in the deactivated mode of the stop devices 24 the tapered control surface 32 is active by working against the stop element 26 and pushing it into the release position against the spring resistance so that subsequently the safety sled 6 can be moved out of the safety rail 4. This allows the entire bench seat 1 to be changed into its non-usage position. For moving the bench seat back into its usage position and/or into the actual adjustable range, the safety sled 6 is also equipped with a rear tapered surface 34 with such a design that even when sliding the bench seat 1 back the stop element 26 is practically pushed away against the spring resistance to open the safety rail 4 until the safety sled has been inserted again completely into the safety rail 4.

In a first embodiment of the invention depicted in FIGS. 3 and 4, the counter-stop 30 is a rigid component of the safety sled 6, while the tapered control surface 32 is formed by an articulating control lever 36. The control lever 36 is moved through connections (not shown) in dependence of the respective positions of the seat back 1a and/or seat cushion 1b of the bench seat 1. The control lever 36 is arranged relative to the counter-stop 30 in such a way that in the activated mode of the locking devices 24 the control lever 36 is in an inactive position, activating the counter-stop 30. This condition is shown in FIG. 4.

In the deactivated mode of the stop devices 24—see FIG. 3—the control lever 36 is in an active position, in which it works together with the stop element 26 through the tapered control surface 32 in order to enable the safety sled 6 to exit the safety rail 4.

In a second embodiment depicted in FIGS. 5 through 8, the tapered control surface 32 is a rigid part of the safety sled 6, while the counter-stop 30 is a component of a moveable control lever arrangement 38, which is arranged in front of the control surface 32 in such a manner as to ensure that in the activated mode of the stop devices 24 a control lever 40 that forms the counter-stop 30 is active in front of the control surface 32 (FIGS. 6 and 8). Otherwise, in the deactivated mode of the stop devices 24, the control lever 40 is in the inactive position, releasing the tapered control surface 32 and thus activating it.

In another preferred embodiment of the invention, the control lever arrangement 38 is equipped with a toggle lever mechanism, which admits the catch lever 40, with two toggle lever sections 42 and 44 in such a way that the catch lever 40 is held rigidly in a position where it is active as counter-stop 30 (FIGS. 6 and 8) by the toggle lever sections 42, 44, which are then extended in approximately a 180° arrangement, i.e. basically in true alignment in one plane 46. The counter-stop 30 then is also in a plane 48 that runs roughly vertically to the sliding direction. By avoiding tapered surfaces, a very rigid, practically positive stop is achieved, and thus safety from nearly any amount of force in the sliding direction.

It should be noted that in the embodiment according to FIGS. 5 through 8 the control lever arrangement 38 is designed in such a way that it works together directly with the seat cushion 1b through an actuation section 50. When the seat cushion 1b is in its position for regular sitting, it pushes directly against the actuation section 50, which is depicted in FIGS. 6 and 8 by an arrow 52, respectively. This effects the activation of the stop devices 24 and/or the counter-stop 30 automatically. The control lever arrangement 38 however has been pre-stressed by a spring 54 so that the actuation section 50 automatically moves in the direction of the arrow 56 when moving the seat cushion 1b away, thus deactivating the stop devices 24 automatically and activating the tapered control surface 32.

The spring-loaded stop element 26 can work together with the tapered control surface 32 and/or the rear tapered surface 34 in another embodiment (not shown) through a sliding and/or roller element in order to reduce friction.

The invention is of course not restricted to the depicted and described embodiments and examples, but rather comprises also all similar embodiments that have the same effect as the invention. Furthermore the invention has not yet been limited to the combination of features defined in claim 1, but can instead be defined also by any other random combination of certain features from all the individual features that have been disclosed. This means that as a rule practically each individual feature of claim 1 can be excluded and/or replaced by at least one individual feature that has been revealed elsewhere in the application. Thus, claim 1 should be understood as only a first formulation attempt for an invention.

What is claimed is:

1. A safety device for a vehicle bench seat that can be moved via two lateral, parallel guide tracks within a vehicle across an adjustable range and can be locked in various positions comprising:

a safety rail arranged parallel to and between the guide tracks;

a safety sled which is guided in a relatively flexible manner at least across the actual adjustable range of the bench seat, wherein the safety sled is arranged in such a manner that the safety sled can move freely lengthwise on the safety rail during regular sliding motions and in positions within the adjustable range of the bench seat and interlocks with the safety rail due to irregular deformations in the area of the bench seat;

wherein the safety rail has a roughly U-shaped cross-section that is open in the direction of the bench seat to allow the safety sled to become interlocked and includes two fastening bridges that limit an upper lengthwise opening, and wherein the safety sled, which interlocks with the safety rail through the lengthwise opening, reaches behind the fastening bridges with two locking sections.

2. The safety device of claim 1, wherein the safety rail is equipped with locking devices, particularly in the form of several recesses that are distributed across the length of the rail in the area of the fastening bridges, in order to allow a locking element of the safety sled to become interlocked.

3. A safety device for a vehicle bench seat that can be moved via two lateral, parallel guide tracks within a vehicle across an adjustable range and can be locked in various positions comprising:

a safety rail arranged parallel to and between the guide tracks;

a safety sled which is guided in a relatively flexible manner at least across the actual adjustable range of the bench seat, wherein the safety sled is arranged in such a manner that the safety sled can move freely lengthwise on the safety rail during regular sliding motions and in positions within the adjustable range of the bench seat and interlocks with the safety rail due to irregular deformations in the area of the bench seat;

wherein the bench seat can be moved beyond the actual adjustable range of the bench seat within the vehicle into a non-usage position and has a seatback that can be oriented in a sitting position and a non-usage position, further comprising:

a number of controllable stop devices incorporated between the safety rail and the safety sled so that the sliding motion of the bench seat is limited to the actual adjustable range due to the activation of the stop devices and thus sliding into the non-usage position is excluded when the bench seat is in the sitting position, and wherein further movement of the bench seat into the non-usage position is allowed only in the non-usage position of the seat back by deactivating the stop devices.

4. The safety device of claim 3, wherein the stop devices block the safety sled in the moving direction from exiting the safety rail in the activated mode of the stop devices, while the safety sled can be moved out of the safety rail lengthwise in the deactivated mode of the stop devices.

5. The safety device of claim 3, wherein in an end area facing in the direction of the non-usage position the safety rail is equipped with a stop element, which is held in a stop position through spring resistance and is moveable against the spring resistance into a release position, and wherein the safety sled is equipped with a counter-stop, and a tapered control surface wherein in the activated mode of the stop devices the counter-stop is active and works against the stop element to limit the range of movement, and wherein in the deactivated mode of the stop devices the tapered control surface is active by working against the stop element and pushing the stop element against spring resistance into the release position so that the safety sled can be moved out of the safety rail.

6. The safety device of claim 5, wherein the safety sled is equipped with a rear tapered surface in such a way that when sliding the bench seat backs out of the non-usage position into the actual adjustable range of the bench seat the stop element is pressed against spring resistance.

7. The safety device of claim 5, wherein the counter-stop is a rigid component of the safety sled, while the tapered control surface is formed by an articulating control lever located in front of the counter-stop in such a way that the control lever in the activated mode of the locking devices is in an inactive position that activates the counter-stop and in the deactivated mode of the locking devices is in an active position that works together with the stop element through the tapered control surface.

8. The safety device of claim 5, wherein the tapered control surface is a rigid part of the safety sled, while the counter-stop is a component of a moveable control level arrangement that is arranged in front of the control surface in such a way that in the activated mode of the stop devices a catch lever forming the counter-stop is located actively in front of the control surface and in the deactivated mode of the stop devices the catch lever is in an inactive position, releasing the tapered control surface.

9. The safety device of claim 8, wherein the control lever arrangement is equipped with a toggle lever mechanism, which admits the catch lever, with two toggle lever sections in such a way that the catch lever is held rigidly in a position where the catch lever is active as a counter-stop by the toggle lever sections which are then extended in approximately a 180 degree arrangement.

10. The safety device of claim 9, wherein the counter-stop is located in a plane that runs vertically to the sliding direction.

11. The safety device of claim 5, wherein the spring-loaded stop element works together with the tapered control surface and the rear tapered surface via a sliding element or a roller element in order to reduce friction.

* * * * *